United States Patent
Geerlings

(10) Patent No.: US 9,965,947 B2
(45) Date of Patent: May 8, 2018

(54) TRAINABLE TRANSCEIVER AND METHOD OF OPERATION UTILIZING EXISTING VEHICLE USER INTERFACES

(71) Applicant: GENTEX CORPORATION, Zeeland, MI (US)

(72) Inventor: Steven L. Geerlings, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days. days.

(21) Appl. No.: 14/875,200

(22) Filed: Oct. 5, 2015

(65) Prior Publication Data

US 2016/0104373 A1  Apr. 14, 2016

Related U.S. Application Data

(60) Provisional application No. 62/061,606, filed on Oct. 8, 2014.

(51) Int. Cl.
  *G08C 17/02* (2006.01)
  *H04Q 9/00* (2006.01)
  *G07C 9/00* (2006.01)

(52) U.S. Cl.
  CPC ......... *G08C 17/02* (2013.01); *G07C 9/00007* (2013.01); *G07C 9/00182* (2013.01); *H04Q 9/00* (2013.01); *G07C 2009/00928* (2013.01); *G08C 2201/20* (2013.01)

(58) Field of Classification Search
  None
  See application file for complete search history.

(56) References Cited

U.S. PATENT DOCUMENTS 6,147,597 A * 11/2000 Facory ............... G07C 9/00182
                                                     307/10.1
2006/0226949 A1  10/2006 Reene
(Continued)

FOREIGN PATENT DOCUMENTS

GB      2 287 337 A    9/1995
RU        144757 U1    8/2014

OTHER PUBLICATIONS

International Search Report and Written Opinion of the International Searching Authority dated Mar. 3, 2016, in PCT/US2015/054008, 8 pages.
(Continued)

*Primary Examiner* — Daniell L Negron
(74) *Attorney, Agent, or Firm* — Foley & Lardner LLP; Bradley D. Johnson

(57) ABSTRACT

A transmitter device for coupling to a vehicle and for conducting a transmission to a remote system includes a transmitter and a processing circuit coupled to the transmitter and having an input interface. The input interface is coupled to an existing user interface of the vehicle for receiving an input to cause the transmitter to conduct its transmission to the remote system. The input interface is coupled to a vehicle sensor for receiving a vehicle sensor input including a motion status of the vehicle. The processing circuit is configured to prevent the transmitter from conducting its transmission to the remote system unless the motion status of the vehicle indicates the vehicle is travelling at a speed less than a threshold speed.

14 Claims, 7 Drawing Sheets

(56) References Cited

U.S. PATENT DOCUMENTS

| | | | |
|---|---|---|---|
| 2010/0210220 A1* | 8/2010 | Chutorash | G07C 9/00309 |
| | | | 455/68 |
| 2013/0099923 A1 | 4/2013 | Zschiedrich | |
| 2014/0111315 A1* | 4/2014 | Geerlings | G07C 9/00309 |
| | | | 340/12.5 |
| 2014/0184393 A1 | 7/2014 | Witkowski et al. | |

OTHER PUBLICATIONS

International Preliminary Report on Patentability and Transmittal received in corresponding International Application No. PCT/US2015/054008 dated Apr. 20, 2017, 7 pages.

Supplementary European Search Report in application No. 15 84 8866.8 dated Aug. 29, 2017, 8 pages.

\* cited by examiner

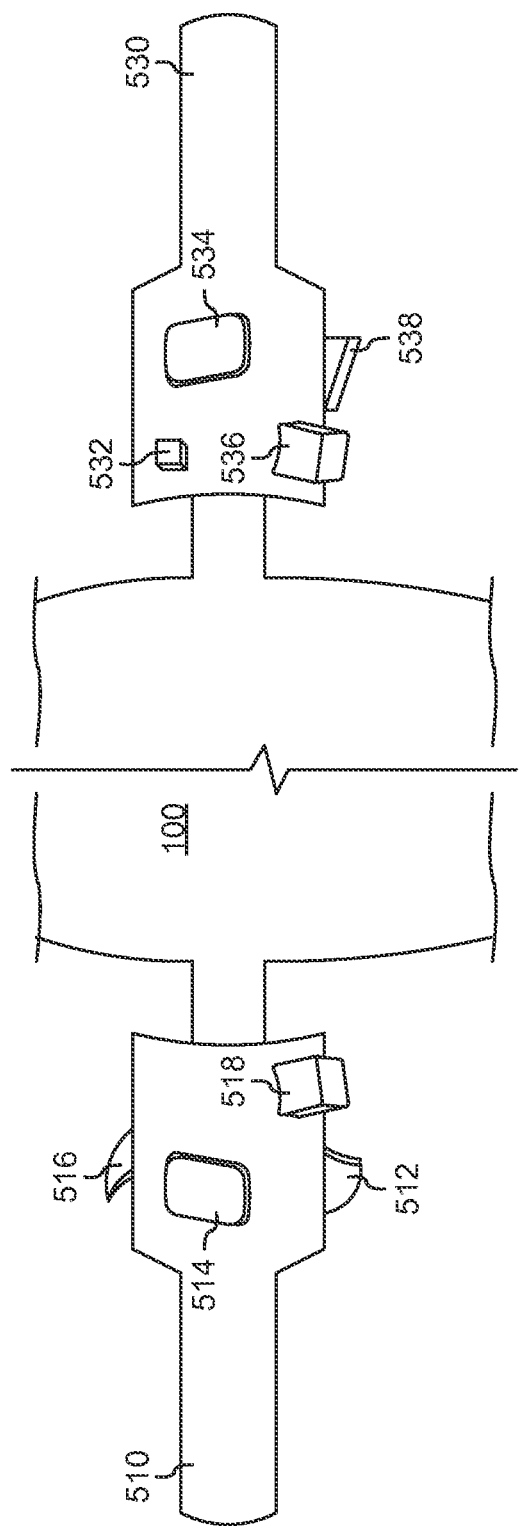

TRAINABLE TRANSCEIVER AND METHOD OF OPERATION UTILIZING EXISTING VEHICLE USER INTERFACES

CROSS-REFERENCE TO RELATED PATENT APPLICATIONS

This application claims the benefit of and to U.S. Provisional Application No. 62/061,606, filed Oct. 8, 2014, which is hereby incorporated by reference in its entirety.

BACKGROUND

The present invention relates generally to the field of vehicles, and more particularly to a trainable transceiver unit for installation in vehicles.

Many larger vehicles (e.g., cars, trucks) may have a button or remote control that is trained to operate, for example, a garage door, security gate, home lighting system, or home security system. Such a button or remote control may be provided in a location easily accessible to a driver or passenger of the vehicle, such as on a rear-view mirror. However, smaller vehicles (e.g., motorcycles) may not always have space for such a remote control or button. For example, for a motorcycle, various buttons may be provided on the handlebars of the motorcycle to operate the vehicle, but the buttons are not intended for use to remotely control, for example, a garage door, security gate, or home system.

SUMMARY

One embodiment of the invention relates to a transmitter device for coupling to a vehicle and for conducting a transmission to a remote system. The transmitter device includes a transmitter and a processing circuit coupled to the transmitter and having an input interface. The input interface is coupled to an existing user interface of the vehicle for receiving an input to cause the transmitter to conduct its transmission to the remote system. The input interface is coupled to a vehicle sensor for receiving a vehicle sensor input including a motion status of the vehicle. The processing circuit is configured to prevent the transmitter from conducting its transmission to the remote system unless the motion status of the vehicle indicates the vehicle is travelling at a speed less than a threshold speed.

Another embodiment relates to a trainable transceiver unit configured to be installed in a vehicle. The trainable transceiver unit includes a user input interface configured to receive a user input, a transceiver circuit configured to receive a control signal from an original transmitter and transmit an activation signal to control operation of a remote electronic system, and a processing circuit. The processing circuit is configured to store a plurality of activation signals and a plurality of predetermined vehicle input patterns associated with the plurality of activation signals, receive a vehicle input pattern from an existing vehicle user interface of the vehicle, identify the vehicle input pattern, and cause the transceiver circuit to transmit an activation signal associated with the identified vehicle input pattern.

Another embodiment relates to a vehicle. The vehicle includes a vehicle user input interface configured to receive user control inputs and generate input signals based on the user control inputs; a data input line coupled to the vehicle user interface; and a trainable transceiver including a transmitter configured to transmit an activation signal to a remote electronic system for controlling operation of the remote electronic system, a user input interface configured to receive user input, an indicator LED, and a control circuit. The control circuit is configured to perform a patterning mode in which the control circuit receives a first input signal from the vehicle user interface via the data input line, extracts first user control inputs from the first input signal, and stores the first user control inputs in memory in response to receiving a user input indicating successful training of the trainable transmitter to the remote electronic system.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 5 is a diagram of vehicle controls that can be used to provide user input to a trainable transceiver unit in a vehicle, according to an exemplary embodiment.

DETAILED DESCRIPTION

Figure 1:
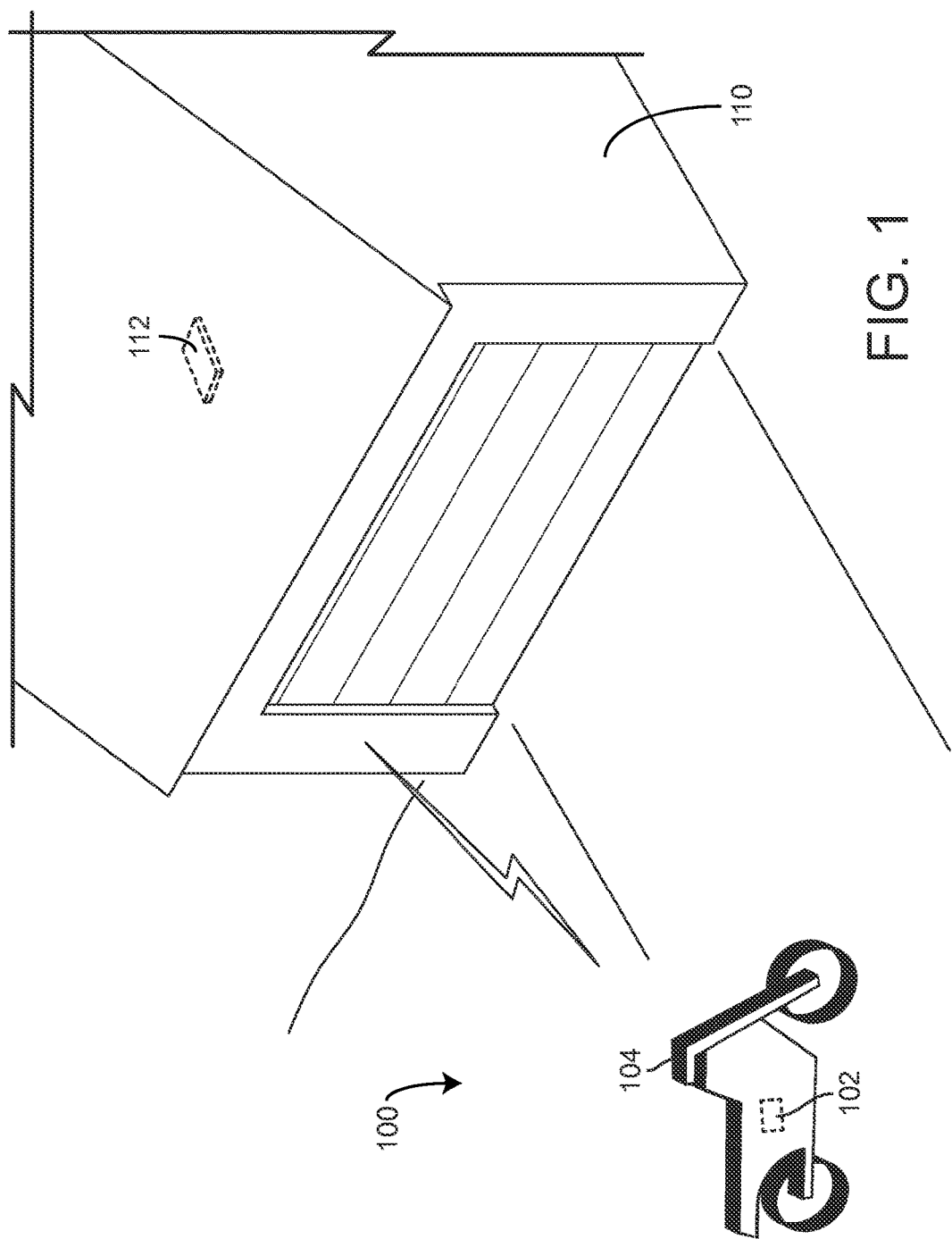
FIG. 1 is a drawing of a vehicle equipped with a trainable transceiver unit configured to communicate with a remote electronic device, according to an exemplary embodiment.

Referring generally to the FIGURES, trainable transceivers and methods for use therewith are shown and described. The trainable transceiver is configured to receive signals from existing user interfaces on a vehicle, rather than the trainable transceiver supplying the buttons for operation within its housing. This is particularly advantageous in the situation where the trainable transceiver is coupled to a smaller vehicle such as a motorcycle. The trainable transceiver can be wired to the vehicle's existing buttons (directly or indirectly). So, for example, buttons located on handle bar switch banks on a motorcycle can be actuated in sequence to activate the transmission from the trainable transceiver to the remote system (e.g., garage door opener). The switches may be allowed to carry out their normal function (e.g., headlight activation, blinker activation, etc.) but also feed into the microcontroller or button interfaces for the trainable transceiver. For example, when the high beam controls and/or other buttons are actuated in a predetermined sequence, the trainable transceiver may receive inputs representative of such control actuations and determine to conduct a transmission based on a predetermined sequence being detected. The trainable transceiver may include buttons local to it for training, but such buttons may not be used (especially if the trainable transceiver is installed outside of reach of a motorcycle rider).

The next few paragraphs contain a general description of a trainable transceiver prior to describing, in more detail, the integration of the existing user interfaces with a trainable transceiver. The trainable transceiver unit may be configured to "learn" the characteristics of multiple remote control signals generated by multiple remote control devices (e.g., a remote control for a garage door, a security gate, a home lighting system, a home security system, etc.) and store an indication of the multiple remote control signals in a local memory thereof for subsequent retransmission. The trainable transceiver unit may reproduce a stored control signal upon receiving a user input (e.g., via a predefined sequence of vehicle control inputs, a push button, a voice command, etc.) and transmit the stored control signal for operating a remote electronic system or device.

The trainable transceiver unit may be integrated within a vehicle system by integrating it with an existing control processor (e.g., a body controller) and existing vehicle controls (e.g., turn signal controls, headlight controls, etc.) already existing in the vehicle. In some embodiments, the existing control processor may be an existing hardware component of a vehicle, but with a novel configuration to implement features of the present disclosure. Advantageously, the trainable transceiver unit may be able to receive a user input using the existing vehicle controls, so that further user input interfaces, beyond the existing vehicle controls, are not necessary for causing the trainable transceiver unit to transmit a control signal. For example, the simultaneous activation of a high-beam headlight control and a left turn signal control may be predefined as a user input identifying a first stored control signal. As another example, the simultaneous activation of a high-beam headlight control and a right turn signal control may be predefined as a user input identifying a second stored control signal. In this way, the user may be able to cause the trainable transceiver unit to transmit particular stored control signals using existing vehicle controls provided on the vehicle. This may be advantageous in small vehicles (e.g., motorcycles, mopeds, all-terrain vehicles, etc.) where limited space is available for providing further user input devices beyond the existing vehicle controls required for operation of the vehicle.

The trainable transceiver unit may include all the necessary processing electronics for learning, storing, and retransmitting a control signal. The trainable transceiver unit may include user input devices (e.g., buttons) that are used in order to train the trainable transceiver unit for a particular control signal. Given that the trainable transceiver unit may only need to be trained infrequently to store particular control signals, the user input devices required for training the trainable transceiver unit may be provided in a location of the vehicle that is not conveniently accessible while operating the vehicle (e.g., under the seat of a motorcycle). The trainable transceiver unit may further include a power source (e.g., a connection to the vehicle battery, a dedicated battery used to power only the trainable transceiver unit, etc.).

Referring now to FIG. 1, a perspective view of a vehicle 100 and garage 110 is shown, according to an exemplary embodiment. Vehicle 100 may be a motorcycle, moped, all-terrain vehicle, or other vehicle. Vehicle 100 is shown to include a trainable transceiver unit 102. In some embodiments, trainable transceiver unit 102 may be integrated with vehicle controls 104. Vehicle controls 104 may be control devices that are used by an operator of vehicle 100 to drive or otherwise operate the vehicle. For example, vehicle controls 104 may be turn signal control switches, headlight control switches, hazard light control switches, cruise control switches, etc.

Advantageously, trainable transceiver unit 102 may be configured to communicate with a control processor. The control processor may receive input signals from the vehicle controls 104. The control processor may transmit output signals to trainable transceiver unit 102. The control processor may transmit the output signals to trainable transceiver unit 102 based on identifying a predefined pattern of input signals from vehicle controls 104. The control processor may be configured to associate one or more predefined patterns of input signals from vehicle controls 104 with one or more output signals to be transmitted to trainable transceiver unit 102. In this way, an operator of vehicle 100 may be able to cause a particular output signal to be transmitted to trainable transceiver unit 102 by executing one or more predefined patterns of inputs using vehicle controls 104.

Trainable transceiver unit 102 is configured to communicate with a remote electronic system 112 of a garage 110 or other structure. In some embodiments, remote electronic system 112 is configured to control operation of a garage door attached to garage 110. In other embodiments, remote electronic system 112 may be a home lighting system, a home security system, a data network (e.g., LAN, WAN, cellular, etc.), a HVAC system, or any other remote electronic system capable of receiving control signals from trainable transceiver unit 102.

Figure 2:
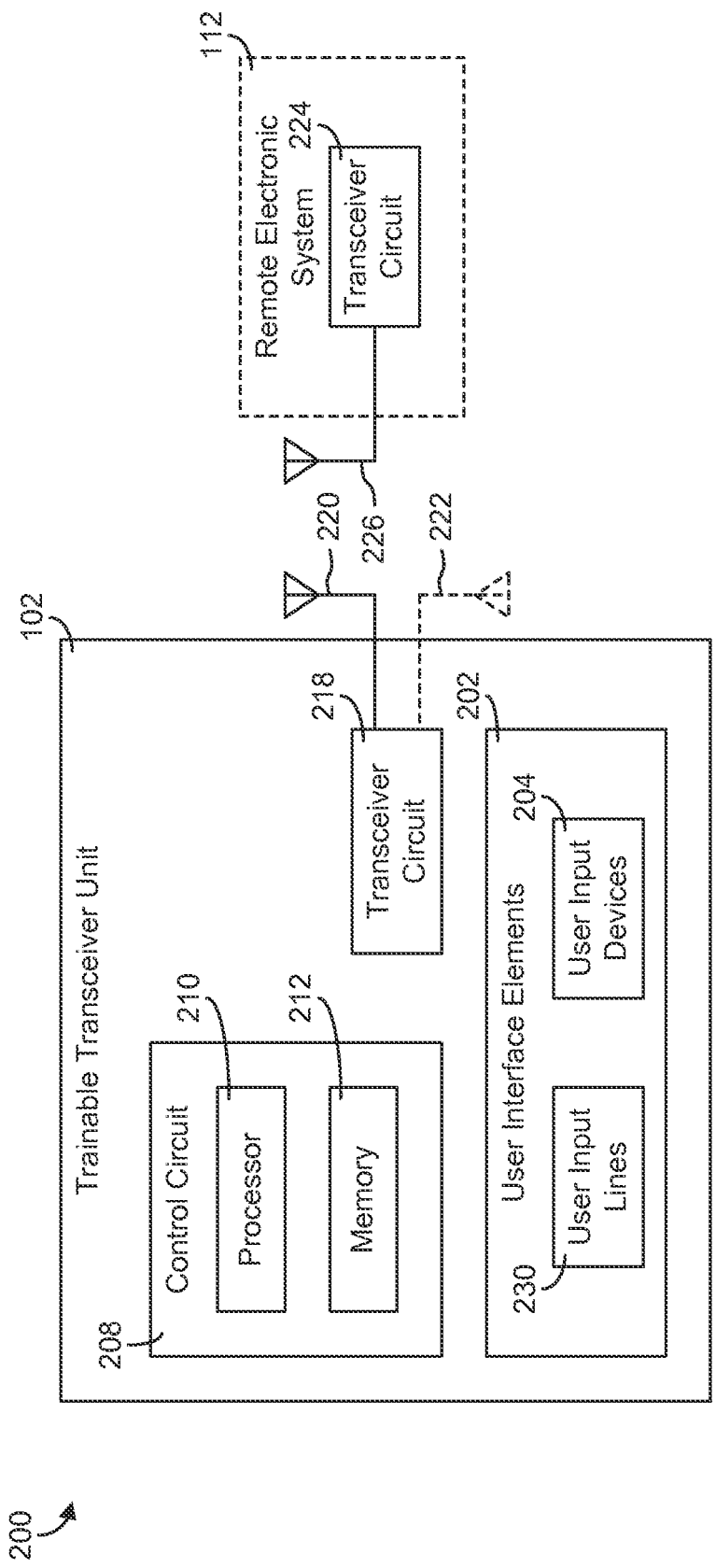
FIG. 2 is a block diagram of the trainable transceiver unit and remote electronic device of FIG. 1, according to an exemplary embodiment.

Referring now to FIG. 2, a block diagram of a system 200 including a trainable transceiver unit 102 and a remote electronic system 112 is shown, according to an exemplary embodiment. In brief overview, trainable transceiver unit 102 is shown to include user interface elements 202, a control circuit 208, and a transceiver circuit 218.

User interface elements 202 may facilitate communication between a user (e.g., driver, passenger, or other occupant of vehicle 100) and trainable transceiver unit 102. For example, user interface elements 202 may be used to receive input from a user. User interface elements 202 are shown to include user input devices 204 and user input lines 230.

In some embodiments, user input devices 204 include one or more push buttons, switches, dials, knobs, touch-sensitive user input devices (e.g., piezoelectric sensors, capacitive touch sensors, etc.), or other devices for translating a tactile input into an electronic data signal. User input devices 204 may be integrated with a housing of trainable transceiver unit 102. User input devices 204 may be accessible to a user at any one of various locations on a vehicle. For example, user input devices 204 may be accessible to an operator of a motorcycle vehicle under the seat of the motorcycle vehicle. In such a situation, the operator may need to first remove the seat of the motorcycle before having access to user input devices 204. User input devices 204 may provide input signals to control circuit 208 for controlling operation of trainable transceiver unit 102.

User input devices 204 may include a touch screen interface through which a user may input commands or information. User input devices 204 may be able to display information to a user and allow the user to learn more about the selections they are making. In some embodiments, user input devices 204 may display a menu for a user to make a selection from. For example, user input devices 204 may show a user options available to her. User input device 204 may display a list of remote electronic systems 112 which are associated with trainable transceiver unit 102. The user may then make a selection by touch through user input devices 204. In some embodiments, the user may enter a combination of touch inputs corresponding to a control signal or other command stored in memory 212, such as a control signal for controlling a remote electronic system (e.g., combinations of swipes, multi-finger movements, pressure-sensitive presses, etc.). For example, a swipe up may correspond to opening a garage door or other movable gate, and a swipe down may correspond to closing a garage door or other movable gate.

In some embodiments, user input lines 230 include one or more data inputs to trainable transceiver unit 102. User input lines 230 may provide one or more electrical signals to the trainable transceiver unit 102. The electrical signals received by trainable transceiver unit 102 on user input lines 230 may indicate one or more control signals stored on trainable transceiver unit 102. In such cases, trainable transceiver unit 102 may respond to the reception of an electrical signal over a particular user input line of user input lines 230 by transmitting the indicated control signal stored on trainable transceiver unit 102.

Still referring to FIG. 2, trainable transceiver unit 102 is shown to include a control circuit 208. Control circuit 208 may be configured to receive input from user input devices 204 and user input lines 230. Control circuit 208 may further be configured to operate transceiver circuit 218 for conducting electronic data communications with remote electronic system 112.

Control circuit 208 is shown to include a processor 210 and memory 212. Processor 210 may be implemented as a general purpose processor, a microprocessor, a microcontroller, an application specific integrated circuit (ASIC), one or more field programmable gate arrays (FPGAs), a CPU, a GPU, a group of processing components, or other suitable electronic processing components.

Memory 212 may include one or more devices (e.g., RAM, ROM, Flash® memory, hard disk storage, etc.) for storing data and/or computer code for completing and/or facilitating the various processes, layers, and modules described in the present disclosure. Memory 212 may comprise volatile memory or non-volatile memory. Memory 212 may include database components, object code components, script components, or any other type of information structure for supporting the various activities and information structures described in the present disclosure. In some implementations, memory 212 is communicably connected to processor 210 via control circuit 208 and includes computer code (e.g., data modules stored in memory 212) for executing one or more control processes described herein.

Still referring to FIG. 2, trainable transceiver unit 102 is shown to include a transceiver circuit 218 and an antenna 220. Transceiver circuit 218 may include transmit and/or receive circuitry configured to communicate via antenna 220 with remote electronic system 112. Transceiver circuit 218 may be configured to transmit wireless control signals having control data for controlling remote electronic system 112. Transceiver circuit 208 may be further configured to receive wireless status signals including status information from remote electronic system 112. Trainable transceiver unit 102 and remote electronic system 112 may communicate using any suitable wireless standard, (e.g., Bluetooth, WiFi, WiMax, etc.) or other communications protocols compatible with or proprietary to remote electronic system 112. Trainable transceiver unit 102 may be configured to learn and replicate control signals using any wireless communications protocol.

In a training mode of operation, transceiver circuit 218 may be configured to receive one or more characteristics of an activation signal sent from an original transmitter for use with remote electronic system 112. An original transmitter may be a remote or hand-held transmitter, which may be sold with remote electronic system 112 or as an after-market item. The original transmitter may be configured to transmit an activation signal at a predetermined carrier frequency and having control data configured to actuate remote electronic system 112. For example, the original transmitter may be a hand-held garage door opener transmitter configured to transmit a garage door opener signal at a frequency (e.g., centered around 315 MHz or 355 MHz, etc.). The activation signal may include control data, which can be a fixed code, a rolling code, or another cryptographically-encoded code. Remote electronic system 112 may be configured to open a garage door, for example, in response to receiving the activation signal from the original transmitter.

Transceiver circuit 218 may be configured to identify and store one or more characteristics of the activation signal (e.g., signal frequency, control data, modulation scheme, etc.) from the original transmitter or from another source. In some embodiments, transceiver circuit 218 is configured to learn at least one characteristic of the activation signal by receiving the activation signal, determining the frequency of the activation signal, and/or demodulating the control data from the activation signal. Alternatively, trainable transceiver unit 102 can receive one or more characteristics of the activation signal by other methods of learning. For example, the one or more characteristics of the activation signal can be preprogrammed into memory 212 during manufacture of trainable transceiver unit 102, input via user input devices 204, or learned via a "guess and test" method. In this manner, trainable transceiver unit 102 need not actually receive the activation signal from an original transmitter in order to identify characteristics of the activation signal. Trainable transceiver unit 102 may store the characteristics of the activation signal in memory 212.

In some embodiments, transceiver circuit 218 is configured to integrate the original transmitter as part of the wireless control system. For example, operation of the original transmitter within range of trainable transceiver unit 102 may provide an activation signal to transceiver circuit 218, indicating that the signal was also sent to remote electronic system 112. In some embodiments, transceiver circuit 218 eliminates the need for continued use of the original transmitter after training is complete.

Transceiver circuit 218 may be configured to generate a carrier frequency at any of a number of frequencies (e.g., in response to a control signal from control circuit 208). In some embodiments, the frequencies generated can be in the ultra-high frequency range (e.g., between 20 and 470 megahertz (MHz), between about 20 and 950 MHz, between about 280 and 434 MHz, up to 868 MHz, up to 920 MHz, up to 960 MHz, etc.) or in other frequency ranges. The control data modulated with the carrier frequency signal may be frequency shift key (FSK) modulated, amplitude shift key (ASK) modulated, or modulated using another modulation technique. Transceiver circuit 218 may be configured to generate a wireless control signal having a fixed code, a rolling code, or other cryptographically encoded control code suitable for use with remote electronic system 112.

Transceiver circuit 218 may use antenna 220 to increase a range or signal quality of the communications between trainable transceiver unit 102 and remote electronic system 112. In some embodiments, antenna 220 is a monopole antenna including a single antenna branch. In other embodiments, a second antenna branch 222 may be used. Antenna branch 222 and antenna 220 may be arranged in a dipole configuration (e.g., extending in opposite directions from an antenna stem, as a dipole loop, etc.). Advantageously, the dipole configuration may improve system performance by preventing resonance at an undesirable frequency.

Still referring to FIG. 2, system 200 is shown to include a remote electronic system 112. Remote electronic system 112 may be any of a plurality of remote electronic systems, such as a garage door opener (as shown in FIG. 1), security gate control system, security lights, remote lighting fixtures or appliances, a home security system, or another set of remote devices. Remote electronic system 112 is shown to include a transceiver circuit 224 and an antenna 226. Transceiver circuit 224 includes transmit and/or receive circuitry configured to communicate via antenna 226 with trainable transceiver unit 102. Transceiver circuit 224 may be configured to receive wireless control signals from trainable transceiver unit 102. The wireless control signals may include control data for controlling operation of remote electronic system 112.

Figure 3:
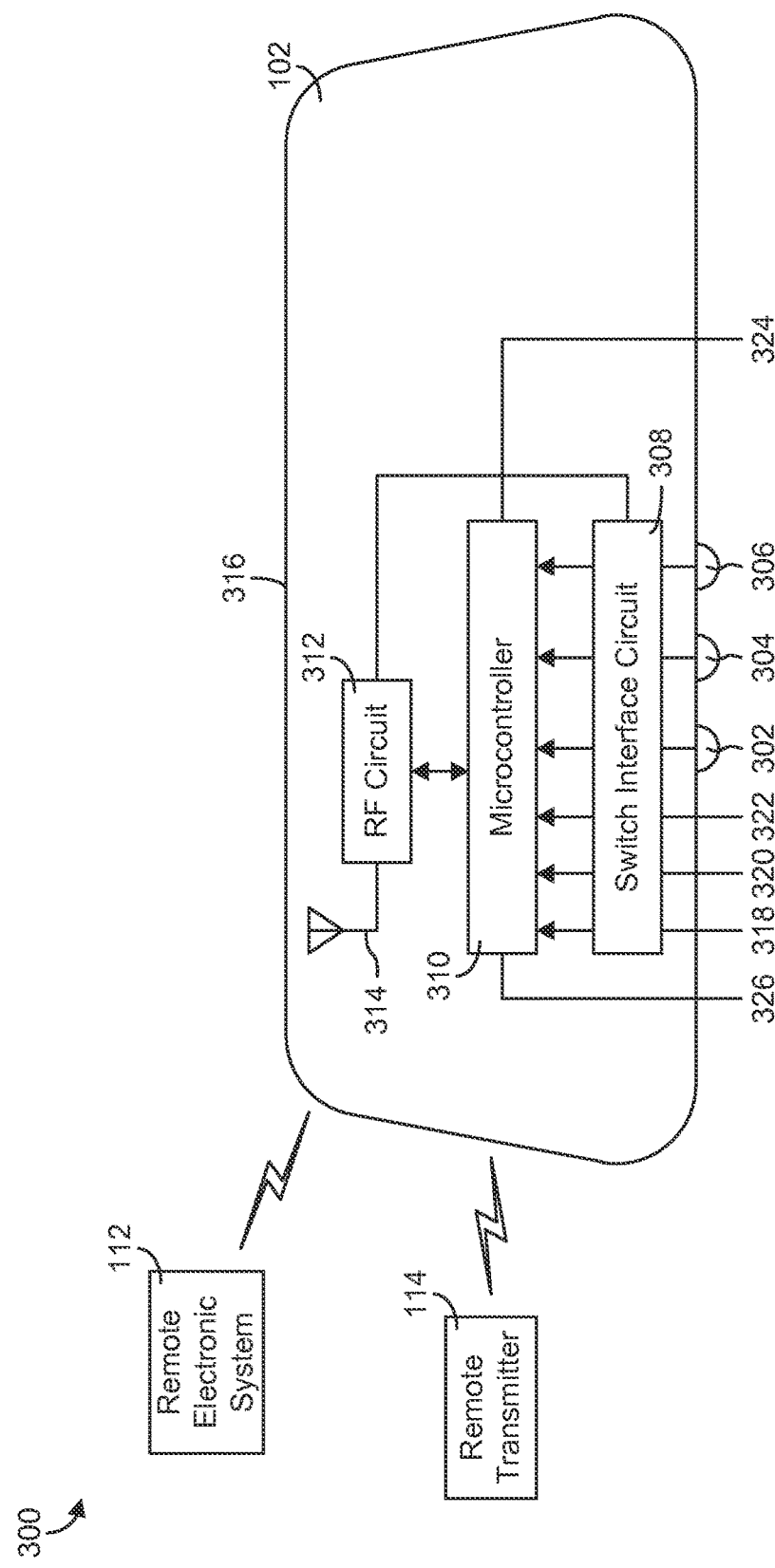
FIG. 3 is an electrical schematic diagram of the trainable transceiver unit of FIG. 2, according to an exemplary embodiment.

Referring now to FIG. 3, an electrical schematic diagram 300 of trainable transceiver unit 102 is shown, according to an exemplary embodiment. Schematic diagram 300 illustrates the data and power connections within trainable transceiver unit 102 as well the electronic data communications between trainable transceiver unit 102, remote electronic system 112, and remote transmitter 114.

Schematic diagram 300 is shown to include several of the components of trainable transceiver unit 102 previously described with reference to FIG. 2. Schematic diagram 300 is shown to include several other components, including buttons 302, 304, and 306, a switch interface circuit 308, a microcontroller 310, a RF circuit 312 with an attached antenna 314, data input lines 318, 320, and 322, power line 324, and ground line 326.

Notably, schematic diagram 300 illustrates the various components of trainable transceiver unit 102 within a housing 316. Housing 316 may be a perimeter frame, rear housing, or other boundary. Advantageously, all components of trainable transceiver unit 102 may be located within or mounted upon housing 316.

Still referring to FIG. 3, schematic diagram 300 is shown to include buttons 302, 304, and 306. Buttons 302-306 may be an embodiment of user input devices 204, as previously described with reference to FIG. 2. For example, buttons 302-306 may be user operable input devices for controlling operation of trainable transceiver unit 102. Each of buttons 302-306 may be associated with (e.g., trained, programmed, configured to operate, etc.) a different remote device controllable by trainable transceiver unit 102. For example, button 302 may be associated with a garage door system, button 304 may be associated with an access gate system, and button 306 may be associated with a home lighting system. Buttons 302-306 may include any number of buttons.

In some embodiments, each remote electronic system 112 controlled by trainable transceiver 102 requires a control signal having different signal characteristics (e.g., operating frequency, modulation scheme, security code, etc.). Each of buttons 302-306 may cause trainable transceiver 102 to emit a control signal having different signal characteristics (e.g., for controlling multiple remote electronic systems with a single device). The transmission of control signals to remote electronic system 112 is dependent on any of a number of factors, including the combination or permutation of buttons pressed. For example, a user may be able to transmit a certain control signal by pressing buttons 302 and 306 at once, or pressing button 302 and 304 sequentially. In some embodiments, a user may be able to input a combination of simultaneous and sequential button presses. In some embodiments, input combinations include an expected order, such that a first input in the combination corresponds to selection of a remote electronic system, a second input in the combination corresponds to selection of a device in the remote electronic system, a third input in the combination corresponds to operation of the device, etc.

Still referring to FIG. 3, schematic diagram 300 is shown to include data input lines 318, 320, and 322. Data input lines 318-322 may be an embodiment of user input lines 230, as previously described with reference to FIG. 2. For example, data input lines 318-322 may receive signals corresponding to predefined patterns of input signals, the predefined patterns of input signals input by an operator of the vehicle with use of vehicle controls of the vehicle. Data input lines 318-322 may include any number of data input lines. While data input lines 318-322 are described as receiving signals in this disclosure, this is not intended to limit the manner in which data input lines 318-322 operate. Data input lines 318-322 may provide indications of particular stored control signals to microcontroller 310 in any of a variety of ways. For example, each of data input lines 318-322 may maintain a logic low voltage level in default operation. When an operator of the vehicle inputs a predefined pattern of input signals associated with a particular data input line of data input lines 318-322, that data input line may be driven to a logic high voltage level. This logic high voltage level may be received by the switch interface circuit 324 in order to cause a corresponding signal to be transmitted to microcontroller 310.

In some embodiments, each remote electronic system 112 controlled by trainable transceiver unit 102 requires a control signal having different signal characteristics (e.g., operating frequency, modulation scheme, security code, etc.). Each of buttons 302-306 may cause trainable transceiver unit 102 to store a control signal having different signal characteristics (e.g., for controlling multiple remote electronic systems with a single trainable transceiver unit). Each of data input lines 318-322 may cause trainable transceiver unit 102 to transmit a control signal having different signal characteristics (e.g., for controlling multiple remote electronic systems with a single trainable transceiver unit).

In some embodiments, each stored control signal may be associated with one button of buttons 302-306 and one data input line of data input lines 318-322. For example, button 302 and data input line 318 may both be associated with a first control signal stored by trainable transceiver unit 102. The user may cause trainable transceiver unit 102 to store the first control signal based on pressing button 302 while transmitting a signal from remote transmitter 114. A signal received on data input line 318 may then cause trainable transceiver unit 102 to transmit the first control signal using RF circuit 312 and antenna 314, whereupon it may be received by remote electronic system 112.

Switch interface circuit 308 may be a circuit element configured to translate a user input received via buttons 302-306 and data input lines 318-322 into an electrical signal for transmission to microcontroller 310. Switch interface circuit 308 may receive an electric current and/or voltage from power line 324 and selectively deliver the received current and/or voltage to a particular port of microcontroller 310. In some embodiments, switch interface circuit 308 delivers the electric current and/or voltage to a microcontroller port in response to receiving a user input signal from one of buttons 302-306 or data input lines 318-322. The particular port of microcontroller 310 to which switch interface circuit 308 routes current and/or voltage may depend on which input device provided the input, e.g., which of buttons 302-306 or data input lines 318-322. Thus, microcontroller 310 may receive a different input from switch interface circuit 308 (e.g., an input received at a different microcontroller port) based on which of buttons 302-306 or data input lines 318-322 provided an input signal.

Still referring to FIG. 3, schematic diagram 300 is shown to include a microcontroller 310 and a RF circuit 312. Microcontroller 310 and RF circuit 312 may be embodiments of control circuit 208 and transceiver circuit 218 as previously described with reference to FIG. 2. Microcontroller 310 may be configured to receive an input from switch interface circuit 308 and to operate RF circuit 312 in response to the input.

RF circuit 312 may be configured to receive a control signal from remote transmitter 114 (e.g., during a training mode of operation), to identify one or more characteristics of the control signal (e.g., frequency, control data, modulation scheme, etc.), and to store the control signal characteristics in a local memory of trainable transceiver unit 102. RF circuit 312 may receive and store any number of control signal characteristics corresponding to any number of remote transmitters 114.

RF circuit 312 may be configured to reproduce the control signal in response to an input received from microcontroller 310. For example, in response to a first input received from microcontroller 310 (e.g., caused by a signal received on data input line 318), RF circuit 312 may reproduce and transmit a first control signal via antenna 314. In response to a second input received from microcontroller 310 (e.g., caused by a signal received on data input line 320), RF circuit 312 may reproduce and transmit a second control signal via antenna 314. In response to a third input received from microcontroller 310 (e.g., caused by a signal received on data input line 322), RF circuit 312 may reproduce and transmit a third control signal via antenna 314. Advantageously, RF circuit 312 may be capable of reproducing any number of control signals for operating any number of remote electronic systems 112.

Figure 4:
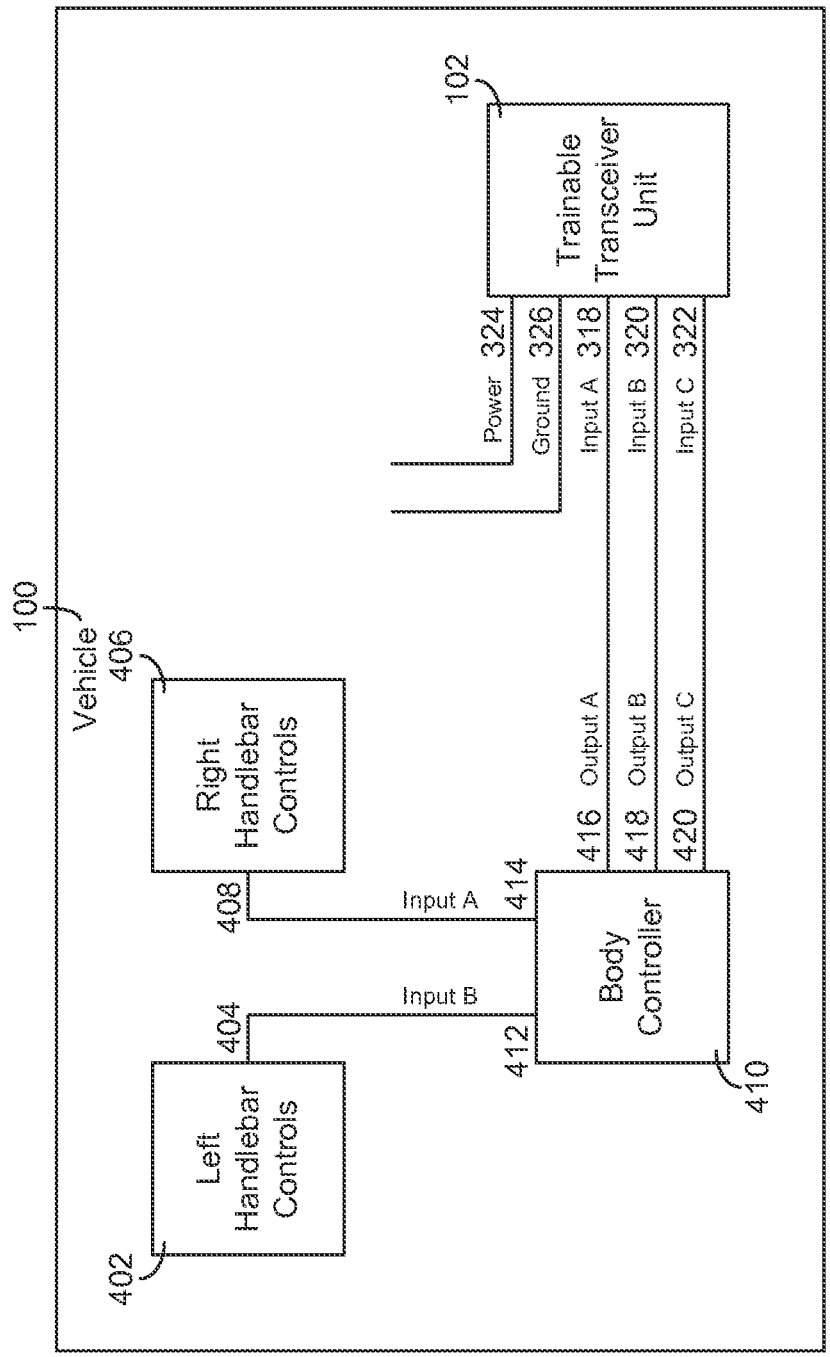
FIG. 4 is a schematic diagram of an installation of a trainable transceiver unit in a vehicle, according to an exemplary embodiment.

Referring now to FIG. 4, a schematic diagram of an installation of a trainable transceiver unit 102 in a vehicle 100 is shown, according to an exemplary embodiment. In this exemplary embodiment, vehicle 100 may be a motorcycle. As such, vehicle 100 is shown having left handlebar controls 402 and right handlebar controls 406. Vehicle 100 is shown as having a body controller 410. Body controller 410 may be a controller device provided in vehicle 100 to monitor and control various electronic accessories of vehicle 100. Trainable transceiver unit 102 is shown. Trainable transceiver unit 102 may be an embodiment of the trainable transceiver units previously discussed with reference to FIGS. 1-3.

In some embodiments, left handlebar controls 402 and right handlebar controls 406 may include vehicle controls for vehicle 100. For example, left handlebar controls 402 and right handlebar controls 406 may be turn signal control switches, headlight control switches, hazard light control switches, cruise control switches, etc.

As shown, left handlebar controls 402 may provide an output signal 404 to body controller 410 as input signal B 412. Likewise, right handlebar controls 406 may provide an output signal 408 to body controller 410 as input signal A 414. Input signal B 412 and input signal A 414 may include signals indicating the activation of left handlebar controls 402 and right handlebar controls 406, respectively. For example, when the operator of vehicle 100 changes a high-beam switch from an "off" position to an "on" position, input signal B 412 may provide an indication of this state change to body controller 410.

In some embodiments, signals 404, 408, 412, and 414 defining the communications interface between left handlebar controls 402/right handlebar controls 406, and body controller 410 may be provided substantially the same as in vehicles without trainable transceiver unit 102. Advantageously, left handlebar controls 402 and right handlebar controls 406 may be provided in vehicle 100 in the same way as provided in other vehicles that do not contain trainable transceiver unit 102. Stated in another way, some embodiments may be implemented without any modification to left handlebar controls 402, right handlebar controls 406, or the signaling between those controls and body controller 410. This may be advantageous in vehicles where the further addition of user input devices is not desirable. For example, on a motorcycle there may be limited space for adding additional user input devices, given that the user input devices may be primarily provided on the handlebars of the motorcycle. As another example, the operator of the motorcycle may not desire to have additional user input devices on the handlebars, as the addition of further user input devices may be confusing to the operator given the large number of user input devices that may already be provided on the handlebars of the motorcycle.

In some embodiments, body controller 410 may be configured to detect predefined patterns of the input signals: input signal B 412 and input signal A 414. Body controller 410 may detect the predefined patterns using hardware, e.g., with a dedicated circuit matching the predefined patterns. Body controller 410 may detect the predefined patterns using software, e.g., a state machine executed by a microprocessor of body controller 410 and transitioning on the values of input signal B 412 and input signal A 414. Body controller 410 may detect the predefined patterns using hardware and software. When body controller 410 detects a predefined pattern of input signals, body controller 410 may transmit a corresponding output signal, such as output signal A 416, output signal B 418, or output signal C 420. Each output signal of output signals 416-420 may be associated with a particular one predefined pattern that body controller 410 is configured to detect. Transmitting an output signal 416-420 may include driving a voltage level for the selected output signal line from a logic low voltage level to a logic high voltage level. In some embodiments, a user may define the predefined patterns, such as during a patterning process for the body controller 410 and/or trainable transceiver unit 102 to receive and store the patterns. For example, when installing trainable transceiver 102, when modifying settings of trainable transceiver 102, or when training trainable transceiver 102 to remote electronic system 112, a part of the patterning process may include a user defining a predefined pattern using user inputs as disclosed herein, and the body controller 410 and/or trainable transceiver unit 102 may record the predefined pattern to associate the predefined pattern with a particular control signal.

In some embodiments, trainable transceiver unit 102 may be configured to receive an input signal as input signal A 318, input signal B 320, or input signal C 322 corresponding to the output signal transmitted by body controller 410. As shown, each output signal of body controller 410 may be associated with a single input signal of trainable transceiver unit 102. Trainable transceiver unit 102 may store a control signal for each of input signals 318-322. Therefore, as discussed with reference to FIG. 3, trainable transceiver unit 102 may be caused to transmit a particular stored control signal using an RF resource and an antenna based on which of input signals 318-322 was received.

Summarizing some of the features just described with reference to FIG. 4, it can be seen that some embodiments allow an operator of vehicle 100 to cause a stored control signal to be transmitted using only a predefined pattern of activation of the existing vehicle controls provided on the vehicle 100. Taking the example of vehicle 100 provided as a motorcycle, the system just described with reference to FIG. 4 may be advantageous in that the operator of the motorcycle may be able to enter a garage or gated area while (1) there is no requirement to have special user input devices provided on the handlebars, and (2) there is no requirement to have the operator to carry a separate transmitter or access card on his/her person. In such an embodiment with vehicle 100 provided as a motorcycle, the convenience and safety of the operator of vehicle 100 may be greatly improved based on these advantageous features.

Referring now to FIG. 5, a diagram of vehicle controls that can be used to provide user input to trainable transceiver unit 102 in a vehicle 100 is shown, according to an exemplary embodiment. In this exemplary embodiment, vehicle 100 may be a motorcycle. As such, vehicle 100 is shown having a left handlebar 510 and a right handlebar 530.

Left handlebar 510 has various vehicle controls provided thereon: turn signal switch 512, headlight high beam toggle switch 514, headlight high beam spring switch 516, and hazard lights toggle switch 518. Turn signal switch 512 may be defined by four states. In a default state, turn signal switch 512 may be in the center position. In a left state, turn signal switch 512 may be moved lateral to the left, whereupon the left turn signal is activated (and turn signal switch 512 may be released to the center position). In a right state, turn signal switch 512 may be moved lateral to the right, whereupon the right turn signal is activated (and turn signal switch 512 may be released to the center position). In a pressed state, turn signal switch 512 may be depressed in towards left handlebar 510, whereupon all turn signals present become deactivated. Headlight high beam toggle switch 514 may be defined by two states. In a first state with the toggle switch pressed forward, the high beam headlight is not activated. In a second state with the toggle switch pressed rearward, the high beam headlight is activated. Headlight high beam toggle switch 514 may remain in the state in which it is placed until further force is applied to again change the state. Headlight high beam spring switch 516 may have two states representing activation and deactivation of the high beam headlight as described for headlight high beam toggle switch 514. However, headlight high beam spring switch 516 may default to a not activated state, and spring back from the activated state to the deactivated state unless continuous pressure is applied. Hazard lights toggle switch 518 may have two states representing activation and deactivation of the hazard lights.

Right handlebar 530 has various vehicle controls provided thereon: vehicle power toggle switch 532, ignition switch 534, cruise control enable/disable switch 536, and cruise control set/reset switch 538. Vehicle power toggle switch 532 may have two states representing activation and deactivation of the electrical power and ignition for vehicle 100. Ignition switch 534 may be a two-state switch, with a default inactive state and another state that causes activation of the ignition system. Cruise control enable/disable switch 536 may have two states representing activation and deactivation of the cruise control feature. Cruise control set/reset switch 538 may have four states and operate similarly to turn signal switch 512, but with the following states: center position causes no action, left position sets current speed to the cruise speed and begins cruising, right position resets previous cruise speed to the cruise speed and begins cruising, and pressed position stops cruising.

Based on this explanation of exemplary vehicle controls of FIG. 5, various predefined patterns of input signals can be discussed. As one exemplary embodiment, three different predefined patterns may be used. A first predefined pattern may be indicated by the user and detected by body controller 410 based on pressing headlight high beam spring switch 516 and, while switch 516 is still pressed, pressing turn signal switch 512 to the center, depressed position. Upon the user operating the vehicle controls as such, body controller 410 may detect the first predefined pattern and transmit a signal to trainable transceiver unit 102 on a first data input line. This may be effective to cause trainable transceiver unit 102 to transmit a first stored control signal. As an example, the user may input the first predefined pattern when arriving home with the first stored control signal effective to open the user's garage door. A second predefined pattern may be indicated by the user and detected by body controller 410 based on pressing headlight high beam spring switch 516 and, while switch 516 is still pressed, pressing the turn signal switch 512 to the left position. A third predefined pattern may be indicated by the user and detected by body controller 410 based on pressing headlight high beam spring switch 516 and, while switch 516 is still pressed, pressing turn signal switch 512 to the right position. The second predefined pattern may correspond to a second stored control signal that is effective to open a security gate in the neighborhood where the user lives. The third predefined pattern may correspond to a third stored control signal that is effective to open a gate at a garage in the building where the user works. In this way, the user may be able to cause particular control signals to be transmitted based on using existing vehicle controls provided on the vehicle 100 in particular patterns. Other predefined patterns using other vehicle controls are possible with various embodiments.

Figure 6:
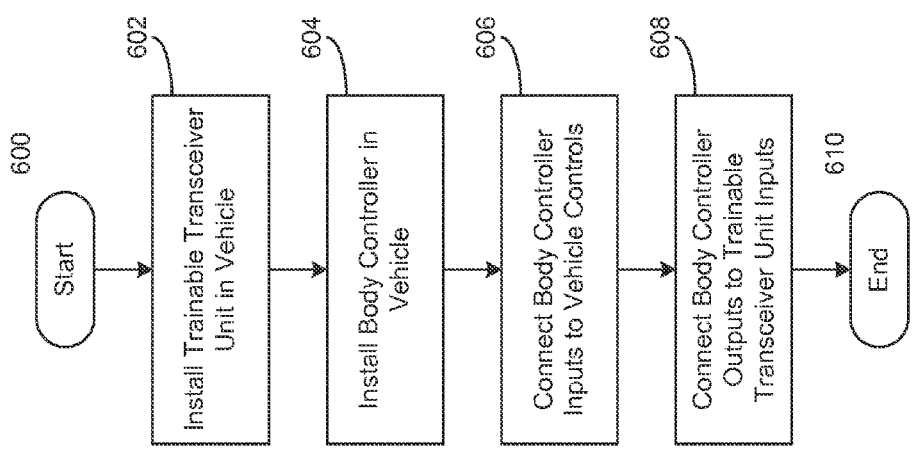
FIG. 6 is a flow chart illustrating a process for integrating a trainable transceiver with a vehicle, according to an exemplary embodiment.

Referring now to FIG. 6, a flowchart of a process for providing a trainable transceiver unit in a vehicle is shown, according to an exemplary embodiment. The process begins at step 600.

The process continues at step 602. At step 602, the trainable transceiver unit is installed in the vehicle. This step may include physically attaching the trainable transceiver unit to the vehicle or some other component thereof. For example, the trainable transceiver unit may be installed under a seat of the vehicle, or in any other location accessible to the vehicle's electronics, even if the location is not easily accessible by a driver or passenger of the vehicle.

The process continues at step 604. At step 604, a body controller is installed in the vehicle. This step may include physically attaching the body controller to the vehicle or some other component thereof. In other embodiments, the vehicle includes a pre-existing body controller, in which case this step may be omitted. In other embodiments, a pre-existing body controller is replaced.

The process continues at step 606. At step 606, inputs of the body controller are connected to vehicle controls. This step may include creating wired connections between vehicle controls provided on the vehicle and one or more input terminals of the body controller. For example, handle-bar controls, headlight controls, turn single controls, cruise controls, etc., may be wired to the input terminals of the body controller. In some embodiments, vehicle controls provided on the vehicle may already be wired to input terminals of the body controller.

The process continues at step 608. At step 608, outputs of the body controller are connected to inputs of the trainable transceiver unit. This step may include creating wired connections between one or more output terminals of the body controller and one or more input terminals of the trainable transceiver unit. The wired connections from the vehicle controls, through the body controller, to the trainable transceiver unit may be tested, such as by actuating a vehicle control and identifying a corresponding indication signal outputted by the trainable transceiver unit (e.g., an LED flash, an audio output, etc.). At step 608, predefined patterns may also be tested and/or recorded at the trainable transceiver unit for future association with vehicle controls and reference to for outputting control signals to a remote electronic system. The process ends at step 610.

Figure 7:
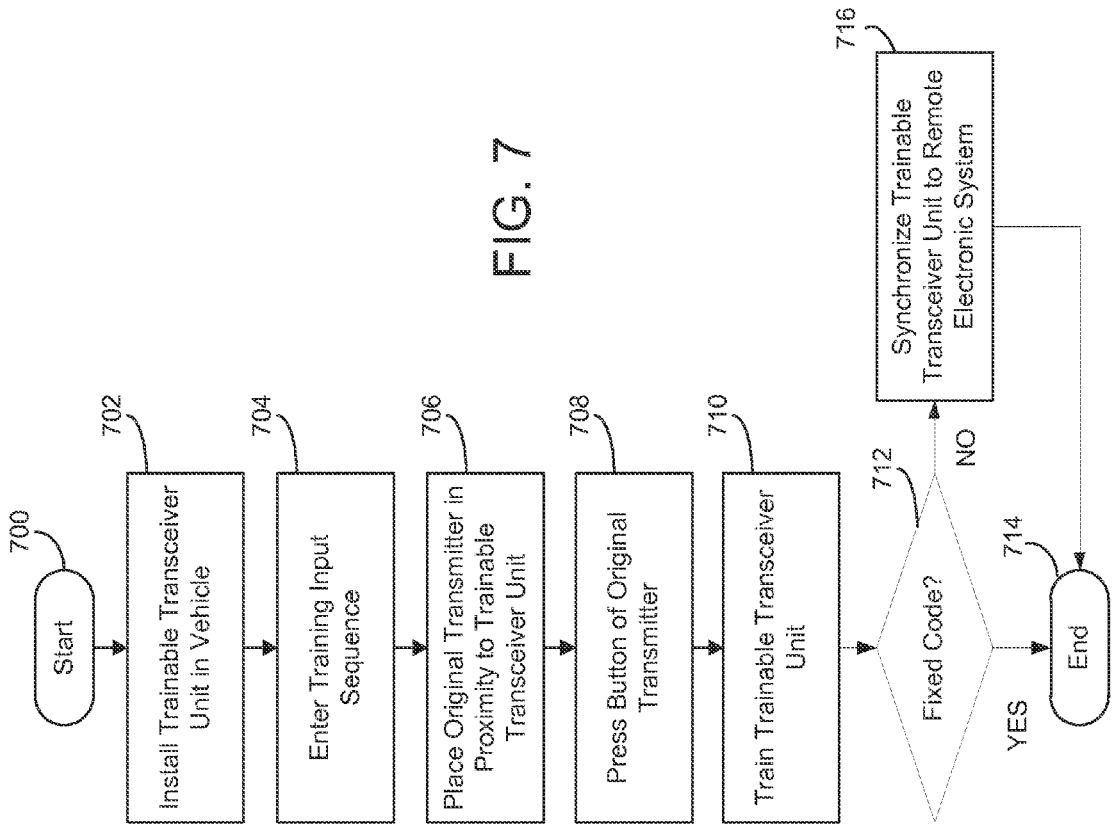
FIG. 7 is a flow chart illustrating a method of operating a trainable transceiver in learn mode, according to an exemplary embodiment.

Referring now to FIG. 7, a flowchart of a process for training a trainable transceiver unit in a vehicle 100 is shown, according to an exemplary embodiment. The process begins at step 700.

In step 702, trainable transceiver unit 102 may be installed under a seat of vehicle 100. The exemplary installation location identified in the process of FIG. 7 is chosen for security of trainable transceiver unit 102 to reduce the likelihood of losing or damaging trainable transceiver unit 102. This step may involve disassembling the seat structure of vehicle 100 and placing trainable transceiver unit 102 in a location specifically designated in vehicle 100 for trainable transceiver 102. In some embodiments, trainable transceiver unit 102 is a standalone unit and is simply attached under the seat of vehicle 100. Trainable transceiver unit 102 may be installed in a location other than under the seat of vehicle 100. In some embodiments, trainable transceiver unit 102 is installed or attached to a more easily accessible location. For example, trainable transceiver unit 102 may be attached to the frame of vehicle 100.

The process continues at step 704. At step 704, an input of a specific sequence or combination associated with entering a learning or training mode is entered through user input devices 204. This step may include the operator of the vehicle accessing user input devices and/or the trainable transceiver unit in a location that is generally not accessible during regular operation of the vehicle (e.g., under the seat of a motorcycle). In some embodiments, the sequence may be a certain order of button presses. In other embodiments, a combination of buttons pressed simultaneously will enter training mode. The specific sequence or combination associated with entering the training mode may depend on the embodiment of user input devices 204. User input devices 204 may be a microphone into which a user may provide voice commands. In some embodiments, user input devices 204 may be a touch screen or other device through which a user may provide tactile input. The specific sequence or combination may be a certain gesture, or a user may make a selection from a menu of options provided on user input device 204. It is understood that the sequence or combination associated with entering the training mode may be any sequence or combination of inputs to user input devices 204.

In step 706, the original transmitter is placed in proximity to trainable transceiver unit 102. Proximity may be defined as within the range of operation of trainable transceiver unit 102, and may depend on the communications protocol through which trainable transceiver unit 102 communicates with remote electronic device 112. In some embodiments, trainable transceiver unit 102 communicates through RF and the range of trainable transceiver unit 102 depends on the frequency at which a control signal is transmitted. For example, the original transmitter may be positioned 1-3" from trainable transceiver unit 102.

The process continues at step 708. A button of the original transmitter which performs the desired action may be pressed while the original transmitter is still in proximity to trainable transceiver unit 102. In some embodiments, the button is the only button on the original transmitter. In some embodiments, there are multiple functions of the original transmitter. The original transmitter may have multiple input methods. For example, the original transmitter may have a touch screen, microphone, or any other input method. In some embodiments, trainable transceiver unit 102 is able to learn multiple functions of the original transmitter simultaneously. In other embodiments, trainable transceiver unit 102 is able to learn one function of the original transmitter at a time.

In step 710, trainable transceiver unit 102 may be trained to perform actions associated with the original transmitter. Trainable transceiver unit 102 may be configured to receive one or more characteristics of an activation signal sent from an original transmitter for use with remote electronic system 112. An original transmitter may be a remote or hand-held transmitter, which may be sold with remote electronic system 112 or as an after-market item. The original transmitter may be configured to transmit an activation signal at a predetermined carrier frequency and having control data configured to actuate remote electronic system 112. For example, the original transmitter may be a hand-held garage door opener transmitter configured to transmit a garage door opener signal at a frequency (e.g., centered around 315 MHz or 390 MHz, etc.). The activation signal may include control data, which can be a fixed code, a rolling code, or another cryptographically-encoded code. Remote electronic system 112 may be configured to open a garage door, for example, in response to receiving the activation signal from the original transmitter. In some embodiments, predetermined inputs are entered to be associated with control signals. For example, a user may define predetermined patterns for training to control a remote electronic system for controlling multiple garage doors of a garage door system. The user may actuate a high beam toggle switch and then actuate a left turn signal to associate an activation signal with a left door of the garage door system. The user may then actuate the high beam toggle switch and then actuate a right turn signal to associate an activation signal with a right door of the garage door system. Feedback may be provided from trainable transceiver unit 102 to guide the user in associating vehicle controls with activation signals. For example, trainable transceiver unit 102 may flash an LED or provide audio feedback, etc., to guide the user. In some embodiments, such predetermined patterns are already stored in the trainable transceiver unit and defaulted to during the training process, without requiring a user to enter inputs with the vehicle controls.

The process continues with step 712. If the activation signal control data is a fixed code, the process ends with step 714. If the activation signal control data is a rolling code, the process continues with step 716. In some embodiments, the activation signal control data is another cryptographically-encoded code, and may require a different process than the one illustrated in FIG. 7. It is understood that the training process of trainable transceiver 102 is not limited to the process illustrated in FIG. 7, and that this process is simply shown according to an exemplary embodiment.

The process may continue with step 716. If the activation signal control data is a rolling code, a user may synchronize their trained trainable transceiver unit 102 to the corresponding remote electronic system 112. In an exemplary embodiment, remote electronic system 112 is a garage door opener. The user may press the garage door opener once and then provide an input associated with controlling remote electronic system 112. For example, a user may toggle high beam toggle switch 514 or flip switch 858 to trainable transceiver control. After synchronizing trained trainable transceiver unit 102 with remote electronic system 112, the process ends with step 714.

Figures 8A, 8B:
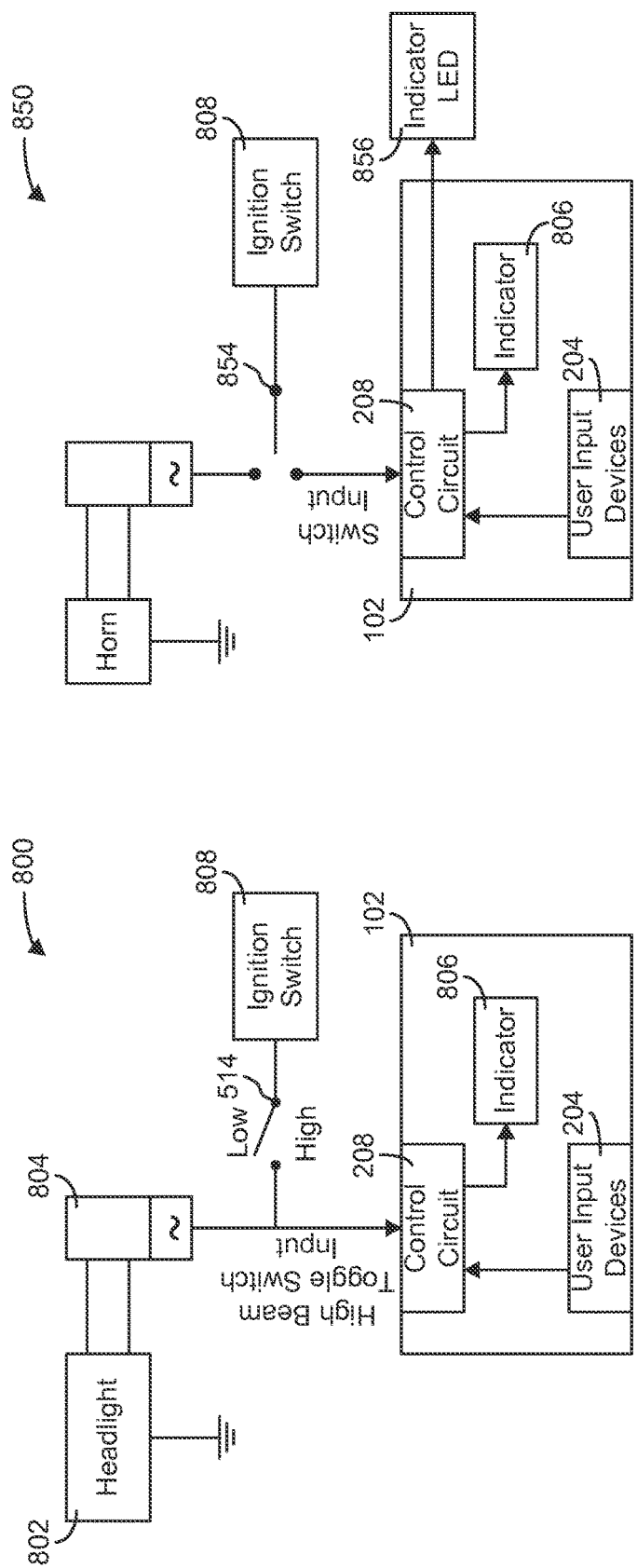
FIG. 8A is a circuit diagram of a headlamp user interface control circuit configured to communicate with a trainable transceiver, according to an exemplary embodiment.
FIG. 8B is a circuit diagram of a user interface button, integrated with a vehicle, configured to communicate with a trainable transceiver, according to an exemplary embodiment.

Referring now to FIG. 8A, a circuit diagram of a headlamp user interface control circuit 800 is shown, according to an exemplary embodiment. Headlamp user interface control circuit 800 is configured to control a headlamp of a vehicle (in some embodiments, a motorcycle 100). Headlamp control circuit 800 is shown to include a headlight 802 of vehicle 100, a signal generator 804, engaged ignition switch 808, high beam toggle switch 514, and trainable transceiver 102. Trainable transceiver unit 102 is shown to include indicator 806, user input devices 204, and control circuit 208.

Ignition switch 808 is engaged in an exemplary embodiment. Control circuit 800 may receive power from the vehicle battery, and may only be operable when vehicle 100 is on. In some embodiments, control circuit 800 receives power from a different power source, and may be operated when the ignition of vehicle 100 is not on.

Signal generator 804 may be a function generator. In some embodiments, signal generator provides a different control signal to headlight 802 which comprises different bulbs for high beam and low beam operation. In some embodiments, the high beam and low beam are produced from different filaments of the same bulb. Signal generator 804 may control which filament is used. It is understood that headlight 802 may be any system or assembly of headlight that may be found in a vehicle.

Indicator 806 may be an LED. In some embodiments, indicator 806 is an existing LED integrated with vehicle 100. Indicator 806 may be any type of component which provides feedback to a user. In some embodiments, indicator 806 may be a speaker which plays a sound. In other embodiments, indicator 806 may be a screen, a touch screen, or any portion of a user interface device. Indicator 806 may be a vibration unit, or otherwise provide tactile feedback to a user. It is understood that indicator 806 may provide feedback to a user in any aural, visual, or other form. Indicator 806 may be controlled to indicate successful or unsuccessful training, patterning, and/or connection operations, such as successful/unsuccessful training to a remote electronic system, connection and/or patterning to a body controller, connection and/or patterning to vehicle user inputs, etc.

Input from high beam toggle switch 514 is sent to the control circuit (e.g., control circuit 208) of trainable transceiver 102 as an input. The control circuit may associate different inputs from high beam toggle switch 514 with different activation signals for activating different components of a remote electronic system or different remote electronic systems. In some embodiments, a specific method of toggling high beam toggle switch 514 is recognized as a specific combination for controlling trainable transceiver 102. For example, toggling high beam toggle switch 514 high-low-high may activate a first stored control signal of trainable transceiver unit 102, such as a stored control signal that corresponds to turning on the lights of a user's home. Toggling high beam toggle switch 514 low-high-low may activate a second stored control signal of trainable transceiver unit 102. In some embodiments, input from the high beam toggle switch 514 is received in combination with other input devices such as turn signal switch 512 may activate a third stored control signal of the trainable transceiver 102 that corresponds to enabling a home security system of a user. It is understood that input from the high beam toggle switch 514 may be combined with input from any user input devices 204 to produce a recognized combination which activates a stored control signal of the trainable transceiver 102.

When input from high beam toggle switch 514 is received by trainable transceiver 102, control circuit 208 determines the action to take. In some embodiments, control circuit 208 may command indicator 806 to provide feedback to a user to indicate that their input has been received, and that an action is being taken. Indicator 806 may be able to show a user which action is being taken, through any of a number of communication methods. In some embodiments, indicator 806 is an LED which may flash a certain number of times to indicate which stored control signal is being transmitted. In other embodiments, indictor 806 is a speaker which plays audio to inform the user which action is being performed. Indicator 806 may be a vibration unit which vibrates for a certain amount of time or for a certain number of times or in a certain pattern to alert the user that their input has been received, and that a specific action is being taken.

In some embodiments, trainable transceiver 102 is operable in a plurality of modes. The mode in which trainable transceiver is currently operating may be communicated to a user through indicator 806. For example, if trainable transceiver 102 is currently in a mode in which a user may train trainable transceiver to learn a specific control signal, indicator 806 may flash a certain color, in a specific pattern, or for a certain number of times or amount of time. In some embodiments, indicator 806 may play audio to inform the user which mode he is in or beep for a certain amount of time or number of times. Indicator 806 may vibrate in a certain pattern, for a certain amount of time, or for a certain number of times. It is understood that indicator 806 may provide feedback to the user regarding which mode he is in any aural, visual, or tactile way.

In some embodiments, control circuit 208 is configured to determine whether to accept an input or perform the corresponding action. Control circuit 208 may communicate with sensors integrated with a vehicle 100, and receive inputs which provide information regarding the status of vehicle 100. In some embodiments, control circuit 208 may use the current speed of vehicle 100 to determine whether to execute a command corresponding to an input received. Control circuit 208 may prevent transmission of a control signal unless the vehicle speed or engine speed is less than a threshold (e.g., vehicle speed is less than 5 mph, less than 10 mph, etc.). For example, if vehicle 100 is currently going 85 mph, control circuit 208 may not transmit a control message corresponding to a user input, but if vehicle 100 is current going 8 mph, and the threshold speed is 10 mph, control circuit 208 may transmit a control message corresponding to a user input. This feature may be activated for safety reasons to discourage distracted driving or unwanted consequences. Blocking control messages may also reduce battery drain and increase operable lifetime of a trainable transceiver 102. This feature may prevent frequent disassembly and installation of trainable transceiver 102 from and on vehicle 100. Control circuit 208 may also be configured to operate in a low power mode in which control messages are blocked based on vehicle status, and a normal or high power mode in which control messages are not blocked, the power mode selection depending on an energy level of the battery (e.g., a battery energy status is less than a battery energy threshold such as 10 percent capacity, 20 percent capacity, etc.).

Referring now to FIG. 8B, a circuit diagram of an integrated trainable transceiver control circuit 850, integrated with a vehicle 100, configured to communicate with a trainable transceiver, is shown according to an exemplary embodiment. Integrated control circuit 850 is shown to include, in one embodiment, a horn 852, a signal generator 804, a switch 854, an indicator LED 856, engaged ignition switch 808, and trainable transceiver unit 102. Trainable transceiver unit 102 is shown to include indicator 806, user input devices 204, and control circuit 208.

Horn 852 may be any component controlled by an input device on a handlebar of the vehicle 100. In some embodiments, horn 852 may be a hazard light or turn signal light. The control circuit of trainable transceiver 102 shown in FIG. 8B differs from that of FIG. 8A in the input method and connections included.

In some embodiments, switch 854 may be a button which already exists on vehicle 100. Switch 854 may be designated as a button for communicating with trainable transceiver unit 102. Switch 854 may share a circuit with an existing feature such as horn 852. In some embodiments, switch 854 may be a toggle switch which switches between providing the function of the existing feature, such as honking horn 852, and providing input to trainable transceiver 102. When an input is received, control circuit 208 may command indicator 806 to provide feedback to a user. Indicator LED 856 may be an LED. In some embodiments, indicator LED 856 is integrated with switch 854. In some embodiments, indicator LED is any type of indicator which may provide feedback to a user.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A trainable transceiver unit, comprising:
    an existing user input interface of a vehicle configured to receive a user input;
    a transceiver circuit configured to receive control signals from original transmitters and transmit activation signals to control operation of remote devices; and
    a processing circuit configured to:
        operate in a training mode to learn a plurality of activation signals for controlling operation of a corresponding remote device of a plurality of remote devices and to associate each of a plurality of predetermined vehicle input patterns received via the existing user input interface with a corresponding activation signal of the plurality of activation signals,
        receive a vehicle input pattern from the existing user input interface of the vehicle,
        identify a remote device from the plurality of remote devices corresponding to the vehicle input pattern, and
        cause the transceiver circuit to transmit an activation signal for controlling the identified remote device associated with the vehicle input pattern.

2. The trainable transceiver unit of claim 1, wherein the existing user input interface is a tactile interface, and the user interface is configured to receive a first tactile input corresponding to a motion associated with a first activation signal, and a second tactile input corresponding to a motion associated with a second activation signal.

3. The trainable transceiver unit of claim 1, wherein the processing circuit prevents transmission of the activation signal unless a vehicle sensor input indicates that a speed of the vehicle is less than a threshold speed.

4. The trainable transceiver unit of claim 1, wherein the processing circuit is only configured to prevent transmission of the activation signal if a battery energy level is less than a battery energy threshold.

5. The trainable transceiver unit of claim 1, wherein the trainable transceiver unit is configured to transmit the activation signal in response to the vehicle input pattern causing a data input line coupled between the trainable transceiver unit and the existing user input interface to switch from a logic low voltage level to logic high voltage level.

6. The trainable transceiver unit of claim 1, wherein each vehicle pattern includes at least two vehicle inputs, wherein a first vehicle input corresponds to selection of a selected remote device, and a second vehicle input corresponds to operation of the selected remote device.

7. The trainable transceiver unit of claim 6, wherein the first vehicle input including actuation of a high-beam toggle switch corresponds to selection of a garage door system, the second vehicle input including actuation of a left turn signal corresponds to operation of a left garage door of the garage door system, and the second vehicle input including actuation of a right turn signal corresponds to operation of a right garage door.

8. A method of operating trainable transceiver units, comprising:
operating, by a trainable transceiver, in a training mode to learn a plurality of activation signals for controlling operation of a corresponding remote device of a plurality of remote devices and to associate each of a plurality of predetermined vehicle input patterns received via an existing user input interface of a vehicle with a corresponding activation signal of a plurality of activation signals;
receiving, by the trainable transceiver, a vehicle input pattern from the existing user input interface of the vehicle;
identifying, by the trainable transceiver, a remote device from the plurality of remote devices corresponding to the vehicle input pattern; and
transmitting, by the trainable transceiver, an activation signal for controlling the identified remote device associated with the vehicle input pattern.

9. The method of claim 8, comprising:
receiving, by the trainable transceiver, via a tactile interface of the existing user input interface, a first tactile input corresponding to a motion associated with a first activation signal; and
receiving, by the trainable transceiver, via the tactile interface, a second tactile input corresponding to a motion associated with a second activation signal.

10. The method of claim 8, comprising:
preventing, by the trainable transceiver, transmission of the activation signal unless a vehicle sensor input indicates that a speed of the vehicle is less than a threshold speed.

11. The method of claim 8, comprising:
preventing, by the trainable transceiver, transmission of the activation signal if a battery energy level is less than a battery energy threshold.

12. The method of claim 8, comprising:
transmitting, by the trainable transceiver, the activation signal in response to the vehicle input pattern causing a data input line coupled between the trainable transceiver unit and the existing user input interface to switch from a logic low voltage level to logic high voltage level.

13. The method of claim 8, wherein each vehicle pattern includes at least two vehicle inputs, wherein a first vehicle input corresponds to selection of a selected remote device, and a second vehicle input corresponds to operation of the selected remote device.

14. The method of claim 13, wherein the first vehicle input including actuation of a high-beam toggle switch corresponds to selection of a garage door system, the second vehicle input including actuation of a left turn signal corresponds to operation of a left garage door of the garage door system, and the second vehicle input including actuation of a right turn signal corresponds to operation of a right garage door.

* * * * *